(12) United States Patent
Neukam

(10) Patent No.: US 10,338,647 B2
(45) Date of Patent: Jul. 2, 2019

(54) HOUSING ASSEMBLY FOR A COMPUTER SYSTEM AND COMPUTER SYSTEM

(71) Applicant: Fujitsu Technology Solutions Intellectual Property GmbH, München (DE)

(72) Inventor: Wilhelm Neukam, München (DE)

(73) Assignee: Fujitsu Client Computing Limited (JP)

( * ) Notice: Subject to any disclaimer, the term of this patent is extended or adjusted under 35 U.S.C. 154(b) by 0 days.

(21) Appl. No.: 15/916,419

(22) Filed: Mar. 9, 2018

(65) Prior Publication Data

US 2018/0267580 A1    Sep. 20, 2018

(30) Foreign Application Priority Data

Mar. 15, 2017 (DE) .......................... 10 2017 105 550

(51) Int. Cl.
| | |
|---|---|
| H05K 5/00 | (2006.01) |
| H05K 7/00 | (2006.01) |
| G06F 1/18 | (2006.01) |
| G06F 1/16 | (2006.01) |
| G06F 1/20 | (2006.01) |

(52) U.S. Cl.
CPC ............ *G06F 1/183* (2013.01); *G06F 1/1656* (2013.01); *G06F 1/20* (2013.01); *G06F 2200/201* (2013.01)

(58) Field of Classification Search
CPC ...................................................... H05K 5/00
See application file for complete search history.

(56) References Cited

U.S. PATENT DOCUMENTS

| | | | |
|---|---|---|---|
| 6,778,386 B2 | 8/2004 | Garnett et al. | |
| 2009/0135558 A1* | 5/2009 | Hughes | H05K 7/20727 361/679.46 |
| 2010/0172098 A1* | 7/2010 | Isoshima | H05K 7/20972 361/697 |

(Continued)

FOREIGN PATENT DOCUMENTS

| | | |
|---|---|---|
| EP | 1 052 884 A2 | 11/2000 |
| WO | 2009/130754 A1 | 10/2009 |

OTHER PUBLICATIONS

Combined Search and Examination Report dated Aug. 2, 2018, of counterpart Great Britain Application No. GB1802567.6.

(Continued)

*Primary Examiner* — Jerry Wu
(74) *Attorney, Agent, or Firm* — DLA Piper (US)

(57) ABSTRACT

A housing assembly for a computer system includes at least one first shielding casing with a first plurality of ventilation openings in an area of a first housing wall of the first shielding casing; and at least one second shielding casing with a second plurality of ventilation openings in an area of a second housing wall of the second shielding casing, wherein a first contact area of the first housing wall of the first shielding casing borders directly on a corresponding second contact area of the second housing wall of the second shielding casing, and at least one of the first housing wall of the first shielding casing and the second housing wall of the second shielding casing includes a recess so that the first plurality of ventilation openings of the first shielding casing is spaced apart from the second plurality of ventilation openings of the second shielding casing.

19 Claims, 3 Drawing Sheets

(56) References Cited

U.S. PATENT DOCUMENTS

2013/0175082 A1* 7/2013 Kim ................... H05K 9/0041
174/383

OTHER PUBLICATIONS

Alexandra Francois-Saint-Cyr, "EMC and Thermal Design Conflicts in a PC," Nov. 1, 2002, http://web.archive.org/web/20160817150812/https://www.electronics [Archivet: Aug. 17, 2016; Abegerufen: Dec. 20, 2017].

HP TouchSmart 520 All-In-One Touchscreen PC Review, http://web.archive.org/web/20160319150853/http://www.ocinside.de/review/hp_touchsmart_520/2/ [Archivert: Mar. 19, 2016; Abgerufen: Dec. 19, 2018].

* cited by examiner

HOUSING ASSEMBLY FOR A COMPUTER SYSTEM AND COMPUTER SYSTEM

TECHNICAL FIELD

This disclosure relates to a computer housing for a computer system, including at least a first shielding casing with a first plurality of ventilation openings, and at least a second shielding casing with a second plurality of ventilation openings and a computer system having such a housing assembly.

BACKGROUND

Housing assemblies for computer systems with at least two shielding casings are known. In particular in particularly compactly constructed computer systems such as, for example, laptop computers or so-called all-in-one desktop computers, individual modules such as, for example, a system component, a power supply unit and/or storage drive are installed in distinct shielding casings to avoid electromagnetic interference. As compared to other housing assemblies such as, for example, those of conventional PCs with a chassis containing all of the components, this possesses the advantage that the housing can be configured more compactly. This is due to fact that, for each individual component, a shielding casing with minimum dimensions can be used.

Such housing assemblies are problematic in that the individual components of the computer system are enclosed comparatively tightly in the respective shielding casings. This complicates in particular the cooling of therein enclosed, heat-generating components.

It could therefore be helpful to provide a housing assembly for a computer system that, for one, enables a particularly compact system construction and, at the same time, enables a simple and cost-effective cooling of all components.

SUMMARY

I provide a housing assembly for a computer system including at least one first shielding casing with a first plurality of ventilation openings in an area of a first housing wall of the first shielding casing; and at least one second shielding casing with a second plurality of ventilation openings in an area of a second housing wall of the second shielding casing, wherein a first contact area of the first housing wall of the first shielding casing borders directly on a corresponding second contact area of the second housing wall of the second shielding casing, and at least one of the first housing wall of the first shielding casing and the second housing wall of the second shielding casing includes a recess so that the first plurality of ventilation openings of the first shielding case is spaced apart from the second plurality of ventilation openings of the second shielding casing.

I also provide a computer system including at least one system board with at least one component arranged thereon; at least one converter circuit that supplies power to at least one component; at least one fan that cools the at least one component arranged on the system board, and the at least one converter circuit; and the housing assembly for a computer system including at least one first shielding casing with a first plurality of ventilation openings in an area of a first housing wall of the first shielding casing; and at least one second shielding casing with a second plurality of ventilation openings in an area of a second housing wall of the second shielding casing, wherein a first contact area of the first housing wall of the first shielding casing borders directly on a corresponding second contact area of the second housing wall of the second shielding casing, and at least one of the first housing wall of the first shielding casing and the second housing wall of the second shielding casing includes a recess so that the first plurality of ventilation openings of the first shielding case is spaced apart from the second plurality of ventilation openings of the second shielding casing, wherein the system board is arranged in the first shielding casing, and the at least one converter circuit is arranged in the second shielding casing.

I further provide an all-in-one computer system including a first shield shielding casing with a first plurality of ventilation openings in an area of a first housing wall of the first shield shielding casing; and a system board with at least one component arranged thereon, the system board and the at least one component arranged in the first shielding casing; a second shield shielding casing with a second plurality of ventilation openings in an area of a second housing wall of the second shield shielding casing; a converter circuit that supplies power to at least one component of the system board, the converter circuit is arranged in the second shielding casing; and a fan configured to cool the at least one component arranged on the system board, and the converter circuit, wherein a first contact area of the first housing wall of the first shielding casing borders directly on a corresponding second contact area of the second housing wall of the second shielding casing, and at least one of the first housing wall of the first shielding casing and the second housing wall of the second shielding casing includes a recess so that the first plurality of ventilation openings of the first shielding casing is spaced apart from the second plurality of ventilation openings of the second shielding casing.

Figure 1:
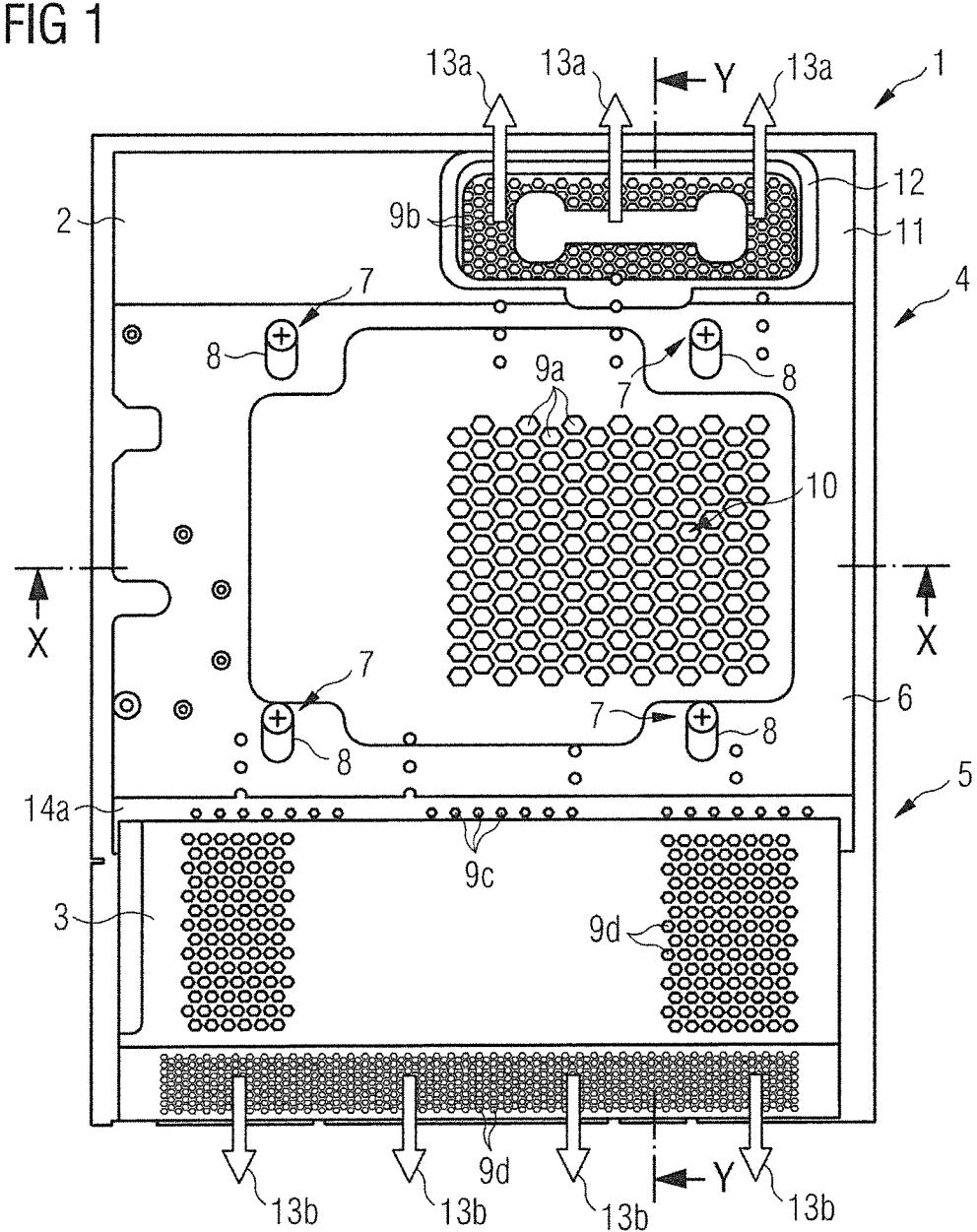
FIG. 1 shows a perspective view of a housing assembly of a computer system with two shielding casings.

LIST OF REFERENCE CHARACTERS 1 computer system
2 first shielding casing
3 second shielding casing
4 system component
5 power supply unit
6 rear side
7 VESA mount
8 fastening dome
9a-f ventilation opening
10 fan
11 sloping area
12 mounting flap
13a-d air flow
14a, b housing wall (of the first shielding casing)
15 ventilation channel
16 intake area
17 heat sink
18 processor 19 base
20 system board
21 screen display
22 first housing shell
23 second housing shell
24 component (of the system component)
25 first contact area
26 recess
27 housing wall (of the second shielding casing)
28 second contact area
29 pressure chamber
30 component (of the power supply unit)
31 storage module

DETAILED DESCRIPTION

I provide a housing assembly for a computer system including at least one first shielding casing with a first plurality of ventilation openings in the area of a first housing wall of the first shielding casing, and at least one second shielding casing with a second plurality of ventilation openings in the area of a second housing wall of the second shielding casing. A first contact region of the first housing wall of the first shielding casing borders directly on a corresponding second contact area of the second housing wall of the second shielding casing. At least one of the first housing wall of the first shielding casing and the second housing wall of the second shielding casing comprises a recess so that the first plurality of ventilation openings of the first shielding casing is arranged in a manner spaced apart from the second plurality of ventilation openings of the second shielding casing.

Such an assembly makes it possible to guide a common air flow to cool components of the computer system both through the first shielding casing and through the second shielding casing. Through the provision of a recess in the area of two directly bordering housing walls, a possible offset between neighboring ventilation openings can thus be compensated for through the air flow.

The housing assembly may include at least one fan to generate an overpressure or underpressure within the first shielding casing, wherein the housing assembly in configured such that, through the overpressure or underpressure within the first shielding casing, a first air flow is generated through the first plurality of ventilation openings in the area of the first housing wall of the first shielding casing, through a gap between the first housing wall and the second housing wall, and through the second plurality of ventilation openings in the area of the second housing wall of the second shielding casing, for the cooling of at least one component arranged in the second shielding casing. Through such an assembly, the passive cooling of the components arranged in the second shielding casing is enabled through generation of an overpressure or underpressure in the first shielding casing.

The gap may form a pressure chamber defined by the first and second contact areas, as well as the first and second housing wall of the first or the second shielding casing. In this way, a cooling air ventilating coupling can be ensured between the first shielding casing and the second shielding casing.

The at least one fan may be arranged within the first shielding casing, and may furthermore be configured to generate a second airflow to cool at least one component arranged in the first shielding casing. In such a configuration, one individual fan can be used to cool components of the first shielding casing as well as of the second shielding casing.

For example, the fan is arranged on a heat sink of a processor, which simultaneously cools the processor and the at least one component arranged in the second shielding casing.

The first shielding casing may comprise at least a third plurality of ventilation openings in the area of a third housing wall of the first shielding casing, and the fan may furthermore be configured to generate a third air flow for the cooling of at least one storage module arranged in the first shielding casing through the third plurality of ventilation openings. Through the provision of further ventilation openings, an air flow generated from a fan can be discharged in a targeted manner in the direction of individual components of the computer system such as in particular a storage module.

The first shielding casing may form an electromagnetic shielding of a system board of the computer system.

The second shielding casing may form an electromagnetic shielding of a fan-less power supply unit of the computer system.

The arrangement and/or the diameter of the plurality of ventilation openings in the area of the first housing wall of the first shielding casing may differ from the arrangement and/or the diameter of the plurality of ventilation openings in the area of the second housing wall of the second shielding casing. This enables in particular a separate design, manufacture, and assembly of the individual shielding casings or components contained therein, which is beneficial, particularly when taking different mechanical, electrical, or other requirements into consideration.

I provide a computer system including at least one system board, at least one converter circuit that supplies power to at least one component arranged on the system board, and at least one fan that cools the at least one component arranged on the system board and the at least one converter circuit. The computer system includes a housing assembly with a first shielding casing and a second shielding casing, wherein the system board is arranged in the first shielding casing, and at least one converter circuit is arranged in the second shielding casing.

Such a computer system can be particularly compactly and cost-efficiently constructed and enables a central cooling of multiple installed modules through a single system fan.

Further advantages are specified in the appended claims as well as the subsequent detailed description of an example. The example is described with reference to the attached figures.

FIG. 1 shows a perspective view of a housing assembly of a computer system 1 with two shielding casings. In particular, FIG. 1 shows a rear view of a so-called all-in-one desktop computer, in which the essential system modules of the computer system 1 such as in particular a system component, a power supply unit and a storage drive are integrated in a housing of a monitor of the computer system 1.

In the view according to FIG. 1, two shielding casings 2 and 3 arranged directly above one another are recognizable, in which different system modules with components of the computer system 1 contained therein are arranged. The first shielding casing 2 receives a system component 4 in form of a system board or mainboard. The second shielding casing 3 receives at least one converter circuit and further components of a power supply unit 5 for the voltage supply of the system component 4.

Although this is not recognizable in FIG. 1, the first shielding casing 2 and the second shielding casing 3 are fastened on their rear side on a support plate of a monitor. A screen display, in particular a liquid-crystal flat screen of the computer system 1 is arranged on the opposite front side of the support plate. To fasten the computer system 1 on a stand or a wall mount, a VESA mount 7 including four fastening domes 8 is arranged on the rear side 6 of the first shielding casing 2 represented in FIG. 2. The first shielding casing 2 thus also transmits force from the VESA mount 7 to the remaining modules of the computer system 1. Accordingly, the first shielding casing 2 is made of relatively stable sheet steel. The second shielding casing 3, by contrast, purely electromagnetically shields the components of the power supply unit 5. Accordingly, the second shielding casing 3 can be made of relatively thin sheet steel, or of another conductive material.

For ventilation of the computer system 1, the first shielding casing 2, as well as the second shielding casing 3 comprise a plurality of ventilation openings. In particular, on the rear side 6 of the first shielding screening 2, a plurality of first ventilation openings 9a is formed through which a fan 10 located behind it sucks fresh air out of the surrounding environment. The sucked-in fresh air is carried away through the remaining ventilation openings of the first shielding casing 2. For example, the first shielding casing 2 comprises in an upper, sloping area 11, a mounting flap 12 with second ventilation openings 9b formed therein. In this example, in particular storage modules of the computer system 1 are arranged below the mounting flap 12. Fresh air sucked in by the fan 10 is therefore blown out as first air flow 13a over the storage modules and through the second ventilation openings 9b of the mounting flap 12 out of the first shielding casing 2.

Below the first shielding casing 2, the second shielding casing 3 of the power supply unit 5 directly adjoins. In FIG. 1, it is recognizable that a lower housing wall 14a of the first shielding casing 2, which contacts the corresponding upper housing wall of the second shielding casing 3, comprises a plurality of third ventilation openings 9c. Likewise, the second shielding casing 3 comprises fourth ventilation openings 9d on multiple sides.

In this example, the fan 10 generates an overpressure in the first shielding casing 2. A cooling air ventilating coupling between the two shielding casings 2 and 3 is enabled through the directly neighboring arrangement of the two shielding casings 2 and 3. Thus, a second air flow 13b is generated from the first ventilation openings 9a via the fan 10 through the third ventilation openings 9c of the lower housing wall 14a, the ventilation openings of the opposite upper housing wall of the second shielding casing 3, and the corresponding fourth ventilation openings 9d of the second shielding casing 3, as described in detail below.

Figure 2:
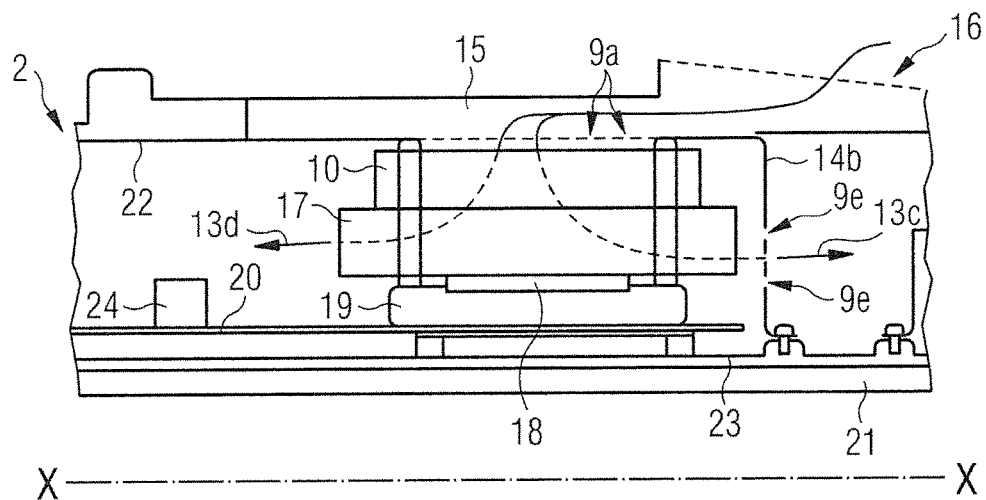
FIG. 2 shows a first cross-section through a first shielding casing of the computer system according to FIG. 1.

FIG. 2 shows a cross-section along the section plane X-X through the first shielding casing 2. Therein can be particularly recognized that the fan 10 intakes fresh air over a ventilation channel 15 out of an intake area 16 arranged offset laterally. The fan 10 accelerates the sucked-in fresh air in the direction of a heat sink 17, which is arranged, in a manner known per se, directly on a component to be cooled, in particular a processor 18 of the computer system 1. The processor 18 itself is accommodated in a corresponding base 19 of a system board 20.

The above-named components 10, 17, 18, 19 and 20 are enclosed by the first shielding casing 2. In the illustrated example, the first shielding casing includes a first housing shell 22 and a second housing shell 23. The second housing shell 23 is a rear support plate arranged parallel below the system board 20 and carries all modules of the computer system 1. A screen display 21 is arranged on its opposite side. Alternatively, the second housing shell 23 can be configured as rear cover plate, which simply solely ensures an electromagnetic shielding of the system components 4.

The first housing shell comprises, in the illustrated section, two areas with ventilation openings 9a and 9e. Besides the first ventilation openings 9a that are directly arranged above the fan 10, a plurality of fifth ventilation openings 9e furthermore are recognizable in a right housing wall 14b, over which a part of the sucked-in fresh air is discharged as third air flow 13c, directly out of the first shielding casing 2. A different part of the sucked-in fresh air leaves the first shielding casing 2 over other ventilation openings, not recognizable in FIG. 2, and thus cools further components 24 of the system board 20 such as, for example, a voltage regulator that regulates a voltage supply of the processor 18.

Figure 3:
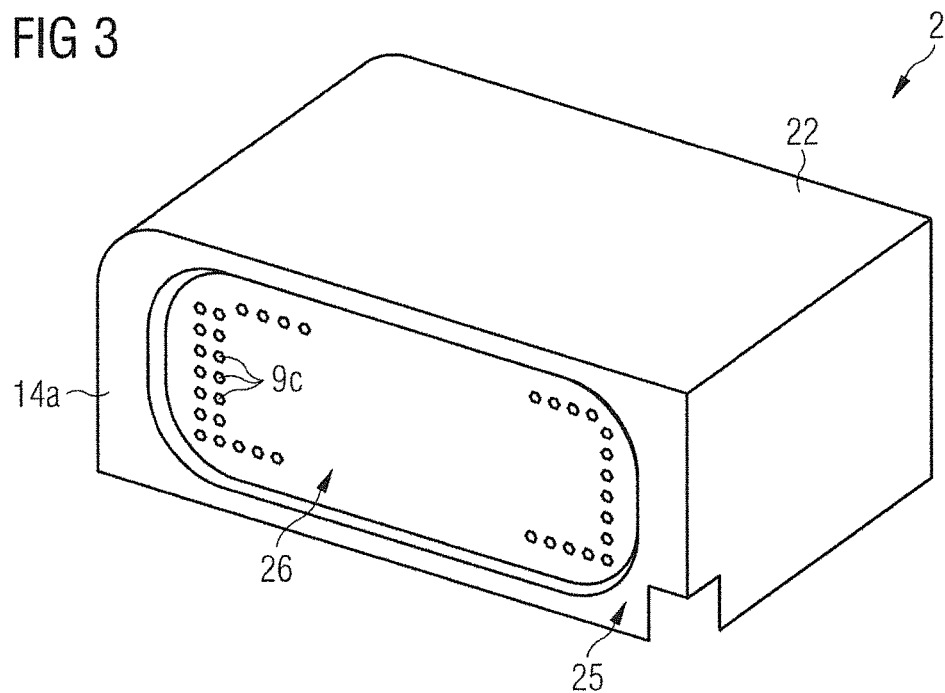
FIG. 3 shows a perspective view of the first shielding casing of the computer system according to FIG. 1.

FIG. 3 shows a perspective view of the first housing shell 22 of the first shielding casing 2. In particular, in the perspective view according to FIG. 3, the lower housing wall 14a can be seen, in which the ventilation openings 9c are formed, which, in the assembled state, point in the direction of the second shielding casing 3 of the power supply unit 5. As is recognizable in FIG. 3, the housing wall 14a comprises a surrounding first contact area 25, as well as a recess 26 enclosed thereby, in which the plurality of third ventilation openings 9c are formed. In the example, the recess 26 can, for example, be formed by stamping of the steel sheet of the first shielding casing 2. Through the stamping, the part of the housing wall 14a, in which the third ventilation openings 9c are formed, is located about 2 mm deeper than the surrounding first contact area 25.

In a directly neighboring arranging of the system components 4 and the power supply unit 5, as represented in the cross section along the section plane Y-Y, a gap results between the third ventilation openings 9c of the first shielding casing 2 and corresponding sixth ventilation openings 9f of the upper housing wall 27 of the second shielding casing 3, through the recess 26 of the lower housing wall 14a. In the first contact area 25 and a corresponding second contact area 28, first shielding casing 2 and the second shielding casing 3 simply directly contact. To improve tightness, it is optionally possible to apply a sealing agent on to the first contact area 25 and/or the second contact area 28 in this area. In the area of the third ventilation openings 9c and sixth ventilation openings 9f, the two housing walls 14a or 27 are spaced apart from one another. The area therebetween thus forms a pressure chamber 29 for the cooling air ventilating coupling of the first shielding casing 2 and the second shielding casing 3. In this manner, a part of the air flow 13b generated from the fan 10 can be used to cool components 30 of the power supply unit 5, in particular parts of a converter circuit that convert a primary mains AC voltage into a secondary DC voltage to supply the system components 4 that are arranged in the second shielding casing 3. The air flow 13a likewise generated from the fan 10, by contrast, cools the storage modules 31.

Through use of the pressure chamber 29, the housing assembly thus becomes independent of the exact arrangement and size of the neighboring ventilation openings 9c and 9f. This is particularly advantageous in the assembly of different system modules of different manufacturers, which, when necessary, are manufactured and mounted with different tolerances.

Figure 4:
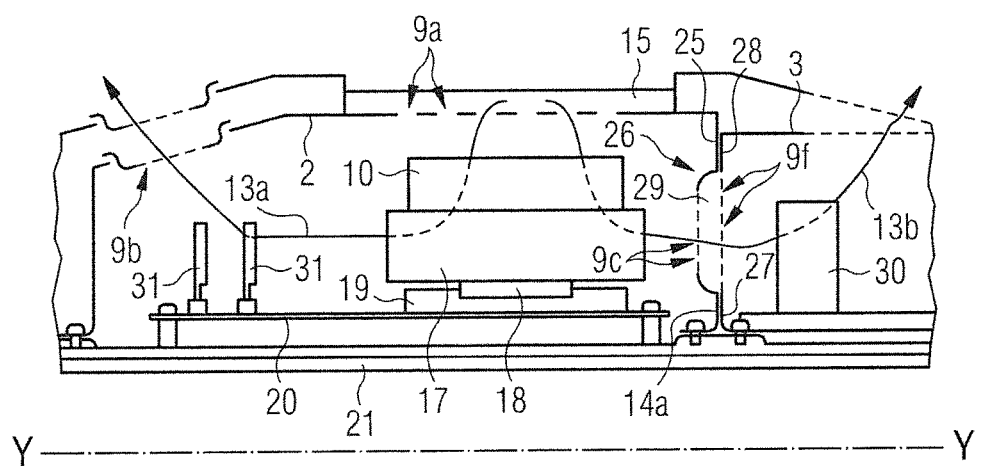
FIG. 4 shows a second cross-section through the two shielding casings of the computer system according to FIG. 1.

Besides forming the recess 26 in the lower housing wall 14a of the first shielding casing 2, represented in FIG. 4, forming a recess in the upper housing wall 27 of the second shielding casing 3 is alternatively or additionally possible. Furthermore, the fan 10 can also be arranged in the second shielding casing 3, or outside of the two shielding casings 2 and 3. A concatenation of more than two shielding casings is possible in principle, as long as an air flow generated to cool all components contained therein is sufficient. The direction of the air flow is also reversible, subject to the requirements of the components to be cooled. In this case, the fan 10 generates an underpressure in the first shielding casing 2. Thus, air is sucked from the second shielding casing 3 through the pressure chamber 29 to the first shielding casings 2 and is expelled by the fan 9 through the first ventilation openings 9a.

Compared to other possible approaches, for example, providing multiple fans for various shielding casings or use of relatively expensive heat pipes for the transmission of thermal energy from components to be cooled to other locations of a housing assembly, the previously-described cooling and ventilation system is particularly simple, economical and energy-saving. In particular, provision of additional fans and the associated mechanical and acoustic problems can be foregone. Furthermore, the individual shielding casings 2 and 3 can be adapted directly to the respective mechanical or electrical requirements of the components enclosed thereby without having to account for potentially neighboring system components.

The invention claimed is:

1. A housing assembly for a computer system comprising: at least one first shielding casing with a first plurality of ventilation openings in an area of a first housing wall of the first shielding casing; and at least one second shielding casing with a second plurality of ventilation openings in an area of a second housing wall of the second shielding casing, wherein a first contact area of the first housing wall of the first shielding casing borders directly on a corresponding second contact area of the second housing wall of the second shielding casing, and at least one of the first housing wall of the first shielding casing and the second housing wall of the second shielding casing comprises a recess, which is enclosed by the first and second contact areas, and in which the first and second plurality of ventilation openings of the respective shielding casing is formed, so that the first plurality of ventilation openings of the first shielding casing is spaced apart from the second plurality of ventilation openings of the second shielding casing.

2. The housing assembly according to claim 1, further comprising at least one fan that generates an overpressure or underpressure within the first shielding casing, wherein the housing assembly is configured such that, through the overpressure or underpressure within the first shielding casing, a first air flow is generated through the first plurality of ventilation openings in the area of the first housing wall of the first shielding casing, through a gap between the first housing wall and the second housing wall, and through the second plurality of ventilation openings in the area of the second housing wall of the second shielding casing to cool at least one component arranged in the second shielding casing.

3. The housing assembly according to claim 2, wherein the gap forms a pressure chamber defined through the first and second contact areas, as well as the first and second housing wall of the first and second shielding casing, respectively.

4. The housing assembly according to claim 2, wherein the at least one fan is arranged within the first shielding casing and adapted to generate a second air flow that cools at least one component arranged in the first shielding casing.

5. The housing assembly according to claim 2, wherein the fan is arranged on a heat sink of a processor.

6. The housing assembly according to claim 2, wherein the first shielding casing comprises at least a third plurality of ventilation openings in an area of a third housing wall of the first shielding casing, and the fan is further adapted to generate a third air flow to cool at least one storage module arranged in the first shielding casing through the third plurality of ventilation openings.

7. The housing assembly according to claim 1, wherein the first shielding casing forms an electromagnetic shielding of a system board of the computer system.

8. The housing assembly according to claim 1, wherein the second shielding casing forms an electromagnetic shielding of a fan-less power supply unit of the computer system.

9. The housing assembly according to claim 1, wherein the arrangement and/or diameter of the plurality of ventilation openings in the area of the first housing wall of the first shielding casing differs from the arrangement and/or the diameter of the plurality of ventilation openings in the area of the second housing wall of the second shielding casing.

10. A computer system comprising:
at least one system board with at least one component arranged thereon;
at least one converter circuit that supplies power to at least one component;
at least one fan that cools the at least one component arranged on the system board, and the at least one converter circuit; and
the housing assembly according to claim 1, wherein the system board is arranged in the first shielding casing, and the at least one converter circuit is arranged in the second shielding casing.

11. An all-in-one computer system comprising: a first shield shielding casing with a first plurality of ventilation openings in an area of a first housing wall of the first shield shielding casing; and a system board with at least one component arranged thereon, the system board and the at least one component arranged in the first shielding casing; a second shield shielding casing with a second plurality of ventilation openings in an area of a second housing wall of the second shield shielding casing; a converter circuit that supplies power to at least one component of the system board, the converter circuit arranged in the second shielding casing; and a fan configured to cool the at least one component arranged on the system board, and the converter circuit, wherein a first contact area of the first housing wall of the first shielding casing borders directly on a corresponding second contact area of the second housing wall of the second shielding casing, and at least one of the first housing wall of the first shielding casing and the second housing wall of the second shielding casing comprises a recess, which is enclosed by the first and second contact areas, and in which the first and second plurality of ventilation openings of the respective shielding casing is formed, so that the first plurality of ventilation openings of the first shielding casing is spaced apart from the second plurality of ventilation openings of the second shielding casing.

12. The all-in-one computer system of claim 11, wherein the fan is configured to generate an overpressure or underpressure within the first shielding casing, the housing assembly is configured such that, through the overpressure or underpressure within the first shielding casing, a first air flow is generated through the first plurality of ventilation openings in the area of the first housing wall of the first shielding casing, through a gap between the first housing wall and the second housing wall, and through the second plurality of ventilation openings in the area of the second housing wall of the second shielding casing to cool at least one component arranged in the second shielding casing.

13. The all-in-one computer system of claim 12, wherein the gap forms a pressure chamber defined through the first and second contact areas, as well as the first and second housing wall of the first and second shielding casing, respectively.

14. The all-in-one computer system of claim 11, wherein the fan is arranged within the first shielding casing, and adapted to generate a second air flow to cool the at least one component arranged in the first shielding casing.

15. The all-in-one computer system of claim 11, wherein the fan is arranged on a heat sink of a processor.

16. The all-in-one computer system of claim 11, wherein the first shielding casing comprises a third plurality of ventilation openings in an area of a third housing wall of the first shielding casing, and the fan is adapted to generate a third air flow to cool at least one storage module arranged in the first shielding casing through the third plurality of ventilation openings.

17. The all-in-one computer system of claim 11, wherein the first shielding casing forms an electromagnetic shielding of the system board of the all-in-one computer system.

18. The all-in-one computer system of claim 11, wherein the second shielding casing forms an electromagnetic shielding of a fan-less power supply unit of the all-in-one computer system.

19. The all-in-one computer system of claim 11, wherein the arrangement and/or the diameter of the plurality of ventilation openings in the area of the first housing wall of the first shielding casing differs from the arrangement and/or the diameter of the plurality of ventilation openings in the area of the second housing wall of the second shielding casing.

* * * * *